(12) United States Patent
Im (10) Patent No.: US 7,264,151 B2
(45) Date of Patent: Sep. 4, 2007

(54) METHOD AND APPARATUS FOR MULTI-LANGUAGE USER SELECTION FOR SYSTEM USER INTERFACE

(75) Inventor: Sung Bin Im, Oakton, VA (US)

(73) Assignee: Goldmine World, Inc., Annandale, VA (US)

( * ) Notice: Subject to any disclaimer, the term of this patent is extended or adjusted under 35 U.S.C. 154(b) by 85 days.

(21) Appl. No.: 11/185,030

(22) Filed: Jul. 20, 2005

(65) Prior Publication Data

US 2007/0017971 A1 Jan. 25, 2007

(51) Int. Cl.
*G06F 19/00* (2006.01)

(52) U.S. Cl. ...................... 235/379; 235/380

(58) Field of Classification Search .......... 235/375, 235/380, 382, 383, 385, 384, 487, 379
See application file for complete search history.

(56) References Cited

U.S. PATENT DOCUMENTS

| | | | |
|---|---|---|---|
| 5,436,436 A | 7/1995 | Matsukawa | 235/380 |
| 5,473,143 A | 12/1995 | Vak et al. | 235/380 |
| 5,895,902 A | 4/1999 | Ziarno | 235/380 |
| 5,895,903 A | 4/1999 | Abe et al. | 235/380 |
| 6,520,410 B2 | 2/2003 | Putman et al. | 235/380 |
| 6,688,518 B1 | 2/2004 | Valencia et al. | 235/379 |
| 6,796,496 B2 | 9/2004 | Andersen et al. | 235/380 |
| 6,857,566 B2 | 2/2005 | Wankmueller | 235/380 |
| 6,857,568 B1 | 2/2005 | Fergen et al. | 235/385 |
| 2003/0132288 A1* | 7/2003 | Fulcher et al. | 235/381 |
| 2005/0236477 A1* | 10/2005 | Chase | 235/383 |

\* cited by examiner

*Primary Examiner*—Karl D. Frech
(74) *Attorney, Agent, or Firm*—Greenberg Traurig, LLP; Paul F. McQuade; James E. Goepel (57) ABSTRACT

A method and apparatus for a credit card and debit card transaction terminal including a processor, a display and a memory. A card reader is configured to read data stored on a portable memory medium. An operator interface is produced by an operator interface program and executable by the processor. The operator interface being displayable on the display in an operator language. A customer interface is produced by a customer interface program and executable by the processor. The customer interface being displayable in a customer language. A language identification module is stored in the memory and executable on the processor. The language identification module is configured to select the operator language and to select a customer language in which displayable for the operator and customer, respectively. The operator and customer languages are selected from a plurality of languages stored in the module. The operator and customer languages are different.

26 Claims, 4 Drawing Sheets

METHOD AND APPARATUS FOR MULTI-LANGUAGE USER SELECTION FOR SYSTEM USER INTERFACE

FIELD OF THE INVENTION

The present invention relates to the field of credit card transaction terminals suitable for use in retail and food services businesses and other establishments that interact with consumers. More specifically, the present invention relates to point of sale terminals and transactions where the customers of a business may speak a language different from the language spoken by the merchant and the credit card transaction terminal processes transactions in more than one language and displays the correct language for the customer and the correct language for the merchant.

BACKGROUND OF THE INVENTION

Credit and debit card usage to conduct commercial transactions between vendors and customers is a daily occurrence in modern life. The ease of use and ubiquitous integration of credit cards into everyday life is such that many customers do not carry cash and rely instead on credit or debit cards for all purchases.

At the same time, increased population mobility and globalization has resulted in varied ethnic groups operating and patronizing businesses, and in some cases, the merchant operating a card terminal may not speak the same language as the customer. This can pose difficulty if the point of sale terminal displays only one language that either the merchant/operator or the customer cannot understand. In such instances, language may become a barrier to completing a transaction. Business establishments in multi-ethnic areas and those whose operators may not speak the language of the local culture in which they are located need to accommodate both merchant and customers by providing terminals usable by each.

In the past, credit card terminals have been programmed to access a database, server or run a program that could only display and print one language per transaction. Typically, that language would be either the language of the merchant or the native language of the business establishment's location. For a customer that does not speak the language displayed by the credit card terminal, the customer might not be able to fully understand the transaction and may distrust the business and forego the transaction. Where the merchant needs operating instructions or needs to troubleshoot the terminal, having a display in the merchant's language while printing receipts or having custom displays in the customer's language is not presently available.

Conventionally, there is a need for a credit card terminal to be able to display information in the merchant's language and display information or print a receipt in the customer's language so that both parties can complete the transaction with a high level of comfort.

SUMMARY OF THE INVENTION

Accordingly, the present invention is directed to a method and apparatus for multi-language user selection for system user interface that substantially obviates one or more of the problems due to limitations and disadvantages of the related art.

An object of the present invention is to provide a credit card and debit card terminal that is able to display information in one language for the merchant and print a record and/or display information for the business transaction in another language that corresponds to the language of the customer.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

One embodiment of the subject-matter of the invention is a credit card and debit card transaction terminal that includes a processor, a display, and a memory. The terminal also includes a card reader configured to read data stored on a memory means of a portable memory medium. Further, an operator interface is produced by an operator interface program stored in the memory and executable by the processor, where the operator interface is displayable on the display in an operator language. The terminal further includes a customer interface that is produced by a customer interface program stored in the memory and executable by the processor where the customer interface is displayable in a customer language. The terminal further includes a language identification module stored in the memory and executable on the processor, the language identification module configured to select the operator language in which the operator interface is displayable for an operator and to select a customer language in which the customer interface is displayable for a customer and where the operator language and the customer language is selected from a plurality of languages stored in the module and the customer language and the operator language are different.

Another embodiment of the subject-matter of the invention is a method for configuring an operator language displayable on a display to a displayable customer language for a credit and debit card transaction, including the steps of identifying the operator language for an operator interface displayable on a display from a language identification module configurable from a plurality of languages where the operator language is provided from an operator interface program. The method includes selecting the operator language from a plurality of languages displayable on a display from an operator interface program and storing the operator language in a memory for displaying the operator interface on the display in the operator language. The method also includes reading the customer language from a portable memory medium of a customer and identifying the customer language for customer interface from a language identification module configurable from a plurality of languages, the customer language is provided from a customer interface program and displayable. The method also includes selecting the customer language from a plurality of languages from the customer interface program and conducting a business transaction, where the business transaction includes displaying the operator interface in the operator language on a display and displaying a customer interface in the customer language, where the operator language and customer language are different.

Another embodiment of the subject-matter of this invention is a computer readable media containing computer-executable instructions, including selecting an operator language displayable on a display from a plurality of languages associated with an operator interface program and storing said operator language in a memory. The subject matter further includes reading a portable memory medium for a customer and identifying a customer language from a portable memory medium and selecting a customer language displayable to the customer from a plurality of language associated with a customer interface program. The subject-matter also includes displaying an operator interface in the operator language provided from the operator interface program for conducting a business transaction and displaying a customer interface in the operator language provided from the customer interface program for conducting a business transaction.

Another embodiment of the subject-matter of this invention is a method for converting an operator language displayable on a display of a portable credit and debit card terminal to a customer language for a business transaction including selecting an operator language from a plurality of languages stored in a language identification module stored in a memory, the language identification module associated with operator language identification module is configured to identify the operator language where the operator language is displayable for the operator interface to an operator on a display and storing the operator language in the memory. The method includes reading a portable memory medium of a customer and identifying from a plurality of languages stored in a language identification module a customer language, the language identification module associated with a customer language identification module is configured to identify the customer language where the customer language is displayable to a customer on a printing mechanism, where, if no customer language is identified, then a default language is selected and displayable to the customer. The method also includes selecting a customer language from a plurality of languages stored in a language identification module stored in a memory; the language identification module associated with customer language identification module is configured to identify the customer language where the operator language is displayable for the customer. The method also includes displaying an operator interface from an operator interface program in the operator language on a display for an operator to conduct a business transaction and displaying a customer interface from a customer interface program in the customer language on the printing mechanism for conducting a business transaction, where the customer language and the operator language are different and providing a customer input configurable to provide input from a customer, where the customer interface is displayable on the display in the customer language for said customer input.

Another embodiment of the subject-matter of this invention is a mechanism for configuring a business transaction by having an operator language interfacing means for displaying an operator language and a customer language interfacing means for displaying a customer language including a means for selecting the operator language from a terminal language identification module stored in a memory configured to include a plurality of languages, the terminal language identification module configured to identify the operator language from a language identification means wherein the operator language is displayed for a merchant on an operator interface and storing said operator language in a memory. The embodiment further includes a means for identifying the customer language from reading a portable memory means of the customer and means for selecting the customer language from a customer language identification means to stored in the memory configured to include a plurality of languages, the customer language identification module configured to identify the customer language in which a customer interface is displayed for the customer. The embodiment also includes means for displaying an operator language on the merchant interfacing means for the business transaction and means for displaying a customer language on the customer language interface means, where the customer language is different than the operator language.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of at least one embodiment of the invention.

In the drawings.

DETAILED DESCRIPTION OF THE PREFERRED EMBODIMENT

Reference will now be made in detail to the preferred embodiments of the present invention, examples of which are illustrated in the accompanying drawings.

Also described herein are one or more exemplary implementations of method and apparatus and for use with a multi-language user selection for system user interface that displays different languages for the customer and worker partaking in a business transaction.

Figure 1:
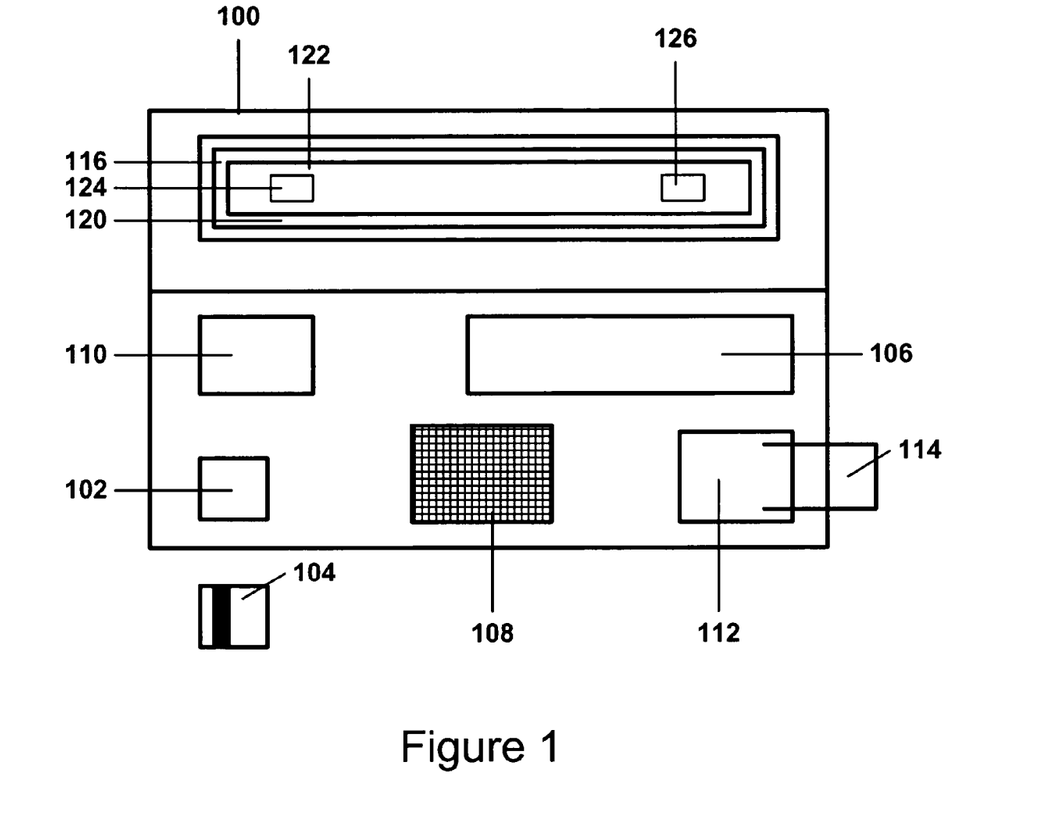
FIG. 1 is a block diagram of an interactive system for use with a portable memory medium.

FIG. 1 is a block diagram of one embodiment of a credit card or debit card terminal 100 ("terminal") according to the subject matter of the present invention. Terminal 100 may be similar to a regular credit card terminal but may be stationary, like set up at cash register or incorporated therein, or the terminal may be portable to allow the merchant to carry the credit card terminal around the business establishment to be utilized at multiple locations in a store, building, market, restaurant or the like. The terminal 100 has similar features to most credit card terminals but may also be without any limitation, a PC, a work station, a dumb terminal or any other manner of system used to conduct a business transaction in a commercial setting. In this embodiment, the terminal 100 will be a normal credit card terminal used at the average retail business. The features of the terminal includes a card read 102 that is configured to read a portable memory medium that would include any form of credit card, debit card, ATM card or the like that has a magnetic strip that stores information pertinent to the owner of the card 104. The card reader 102 may accept the card 104 in any physical manner, for example, internally or via swiping, or may be configured to read an integrated chip (IC) or radio frequency (RFID) memory without physically having to accept the card 104. For example, instead of physically swiping the card 104, the card reader 104 may be able to read the RFID memory and conduct all the necessary steps to conduct the business transaction as if it was a regular credit card. In this embodiment, it is assumed that the terminal 100 is configured to internally accept a card into the terminal 100 via swiping, where the card reader 102 reads a memory strip on the card 102. The terminal 100 also has a keyboard 108 that allows manual entry of a user inputs by the merchant or depending on the business transaction inputs from a customer. The user inputs could include telephone numbers, a customer pin number for a debit card transactions, a credit card number by the business establishment if for some reason the card reader 102 is unable to read the card 104 or user inputs that are necessary to meet the needs of the merchant. The keyboard 108 may also be used for the merchant to select the appropriate language for the user interface display 106 and the keyboard may also allow the merchant to select the language to be printed on the receipt 114, as discussed further below. The keyboard 108 may be any form of input means including a keyboard, touch pad, actuator or similar device.

Figure 4:
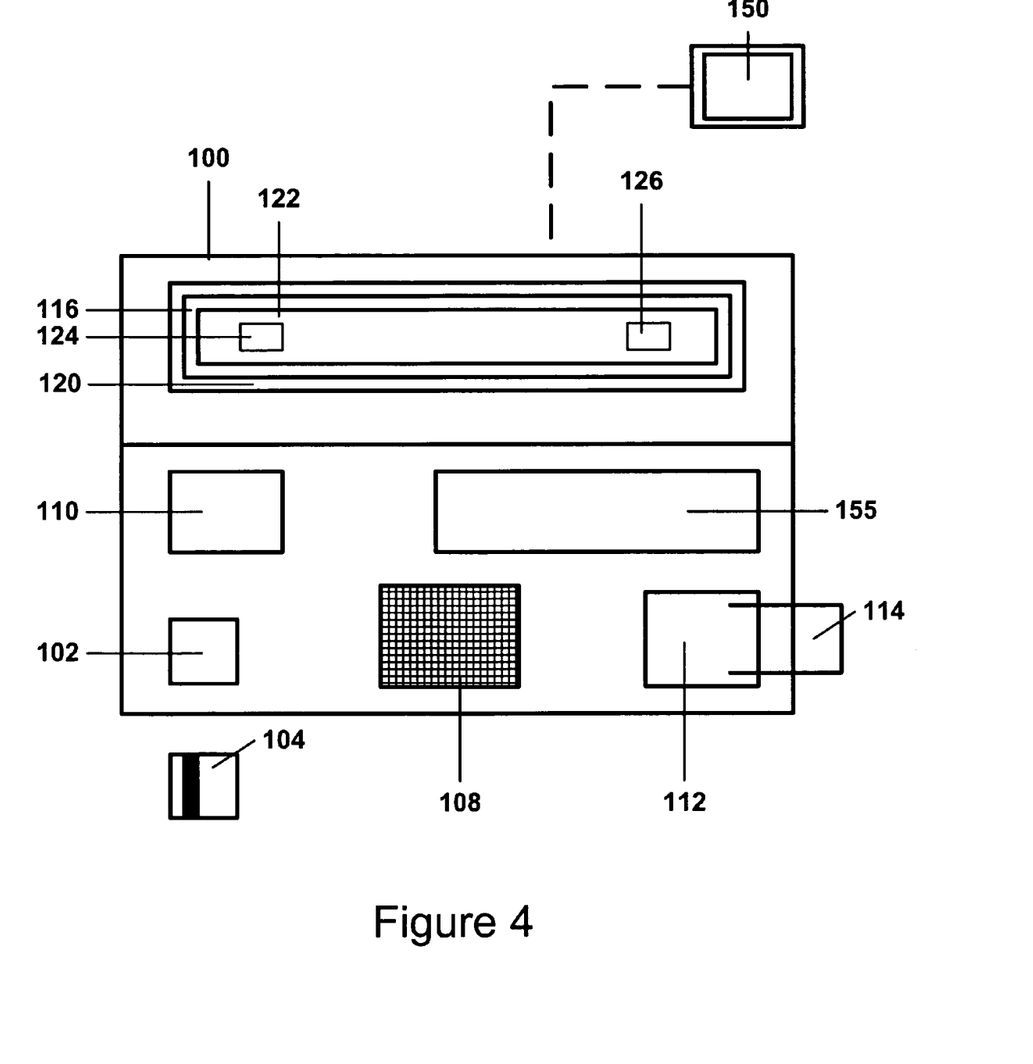
FIG. 4 is a block diagram of an interactive system for use with a portable memory medium where the interactive system has more than one display.

The terminal 100 also has a user interface display 106 that will display or show information to the merchant that would be pertinent to the business establishment including time, date, sales price and instructions to enter data at the appropriate time along with other items that might be displayed during a business transaction by a credit card terminal or when the terminal is awaiting a business transaction. The user interface display 106 could be any manner of display including LCD, screen, television or computer screen, or a typical monochrome screen found in a credit card terminal. The terminal 100 further includes a processor 110 that will process the business transaction into the appropriate systems and displays to complete the transaction. The processor may also be utilized to process the various modules from a memory 108 and may also be used for the merchant to select the appropriate language for the user interface display 106. The user interface display 106 may also be used to display information to the customer or be used as a customer interface and, if the user interface display 106 is used or viewed by a customer then the user interface display 106 will display the pertinent information to the customer in the customer language. As shown in FIG. 4, there maybe more that one user interface display 106 if, for example, the business establishment has a display configured at the business transaction location of the business establishment to have a merchant display 150 for displaying the business transaction to merchant or operator and a customer display 155 to display information to the customer.

The terminal 100 further may include a printer 112 that will print a receipt 114 as a recordation of the business transaction. The printer 112 may be some other form of customer interface that will provide a record of the business transaction to the customer. Such customer interface could be a printer with a receipt, a computer providing an electronic or print receipt, a touch screen or keyboard permitting customer to the terminal or any other recordation system used in the customer retail business. The printer 112 may also be able to print a receipt 114 in the single piece of paper format for the customer to sign with multiple copies printed by the printer 112, the dual carbon copy format for the customer to sign or any other form contemplated by skilled artisan. In this embodiment, customer interface is assumed to be a printer 112 that will print a receipt 114 that is dual carbon copy format for the customer to execute. Also, the printer 112 does not have to be physically and internally associated with the terminal but may be connected by electronic means including without limitation an Ethernet connection, broadband, T-1 connection, DSL, phone lines, wireless, coaxial cables or any other manner contemplated that would associate a terminal 100 with a printer 112. For discussion purposes only the printer 112 will be assumed to be internally connected to the terminal 100 as shown in FIG. 1. The receipt 114 that is printed by printer 112 displays the typical writings, information and expressions that are normally found on a receipt 114 that a merchant would give to a customer for a business transaction including, but not limited, to such items as price, business establishment's name, the business establishment's location and phone number, time of the business transaction, customer signature line, customer account information and any other possible information that would normally be included on a credit card receipt. In the subject matter of the invention all of this information would be in the customer's language for the customer's comfort.

The terminal 100 also contains a memory 116 that stores programs used in a typical business transaction that occurs on a credit card terminal. The memory 116 further stores an interface language program 120 that generates an operator interface that is displayed on the user interface display 106 to aid the merchant or operator with the business transaction. The interface language program 120 includes a language identification module 122 that is utilized by the interface language program 120 to identify and select the appropriate language to be displayed on the user interface 106 or receipt 114. The language identification module 122 will select an interface language for the operator interface and select the customer interface by running one of two sub-routines depending on the task to be completed. Each sub-routine may be utilized separately for conducting the business transaction. The first sub-routine is the terminal language identification module 124 that runs to identify, select and display the appropriate language for the merchant on the user interface display 106. The terminal language identification module 124 can be read out from stored group of languages in the memory in advance of any business transaction. The terminal language identification 124 sub-routine may be run a few times, for example during the initial set-up of the terminal by the merchant or maybe when a worker that speaks one language is replaced by a worker that speaks another during a shift change. The second sub-routine is a customer language identification module 126 that runs to identify, select and display the appropriate language for the customer on the receipt 114 that is printed by the printer 112 or some other form of customer interface. The customer language identification module 126 is run in a similar manner as the terminal language identification module 124 in that it reads from a stored group of language from the memory 116 that can be displayed to the customer. The customer language identification module 126 may run when it is necessary for a receipt 114 to be printed in a customer language for a credit or debit card transaction and could be run multiple times a day, hour, or week. The methodology of these tasks will be described in greater detail below.

The language identification module 122 may have an extensive array of languages to select from to be displayed as the interface language, be it an operator interface or customer interface language, for the respective merchant and customer. The terminal language identification module 124 and customer language identification module 126 are associated to run the necessary interface language to be displayed on the user interface display and/or the receipt. The plurality of languages available to the interface language would only be limited by the size of the memory necessary to store the languages and the costs associated with translating the interface language for displaying on the user interface display 106 or display on the customer interface or receipt 112. The language identification module 122 may include a text representation of the name of the language, or it may be in code form that is reconciled by the processor 110 or computing device in the terminal 100 for the interface language to be displayed. Any representation that may be used to automatically identify and display an appropriate interface language may displayed on the user interface display 106 or displayed on the receipt 112.

Figure 2:
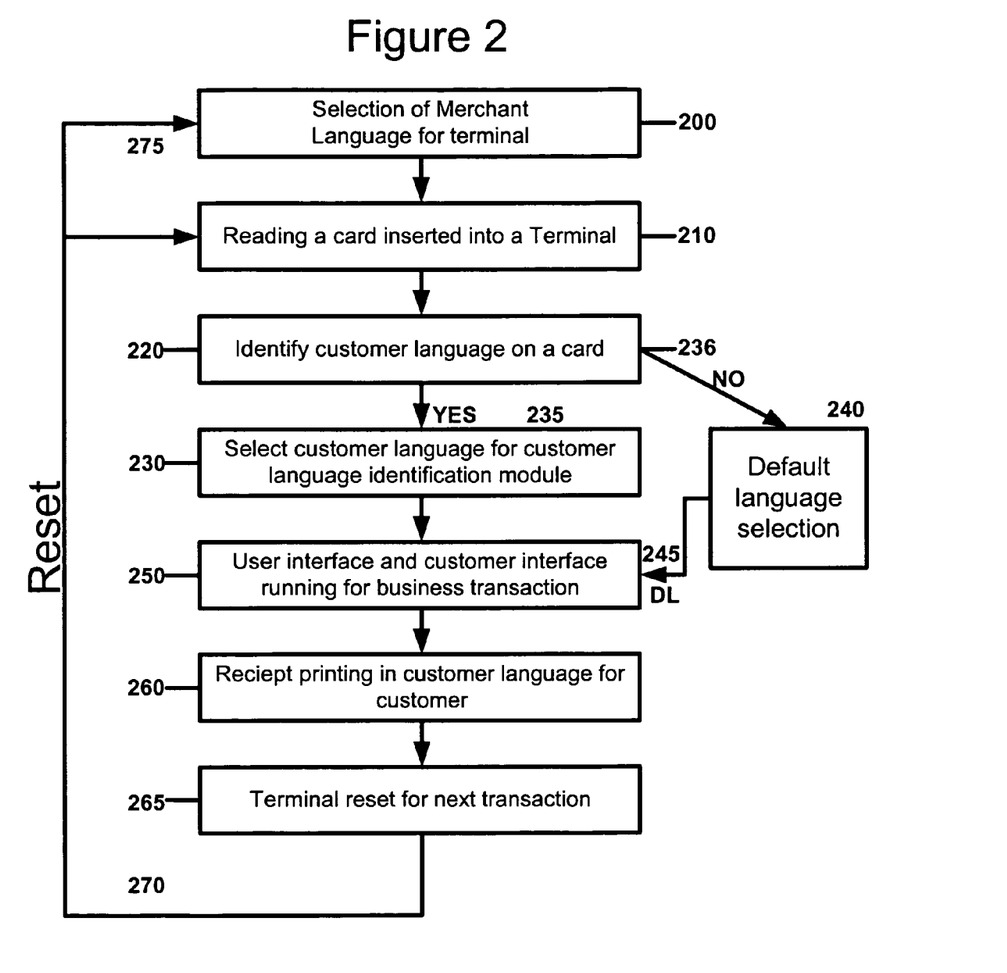
FIG. 2 is a flow diagram depicting a method of use in a system that provides one language for the user interface display and another language for displaying the customer interface.

FIG. 2 is a flow diagram depicting another embodiment of a method for use in a system that provides one language for the user interface display 106 and another language for displaying on the customer interface or receipt 114 that is printed by the printer 112. In this embodiment, this is assumed to a stationary credit card terminal, as shown in FIG. 1, and is located in a retail business establishment and the card is assumed to be a typically credit card with a magnetic strip that stores a customer's pertinent information. However, it is noted that this is no way meant to limit the application of the invention in any way.

At block 200, the merchant may select and store in the memory 116 the merchant language used on the user interface display 106 or may allow a default language to be displayed on the user interface display 106 of the terminal 100 in the details that are described below. The terminal 100 may be configured for the merchant to utilize the keyboard 108 and the user interface display 106 to search through the plurality of languages that are provided by the language identification module 122 via running the terminal language identification module 124 sub-routine to display the interface language for the language to be displayed on the user interface display 106, otherwise know as the operator language or merchant language. The merchant utilizes the keyboard 108 to designate or select the appropriate language necessary for the user interface display 106. Other possible embodiments of selecting the interface language to be used by the merchant would be to have a default language selected for the terminal 100 prior to activating the terminal that would match the language of the merchant or possibly have the terminal 100 configured to access an internet web site and download the appropriate operator interface language into the language identification module 122 and run the terminal language identification module 124 prior to activating the terminal 100. The interface language for customer language can be selected via the customer language identification module 126 and may be searched and selected in the same manner except for as described below. The terminal 100 may also be configured to allow the operator interface language to be displayed on the user interface display 106 to be changed from one language to another by the merchant to accommodate operators or users that work at the credit card terminal and that might speak different languages but work in the same business establishment.

At block 210, the terminal 100 is configured to accept a portable memory medium like a credit card with a magnetic strip which permits the card reader 102 to detect the card 104 when it is inserted or swiped by the terminal 100. The terminal 100 is configured to read the card 104 and determine if a particular language has been stored on the card's memory as shown in block 220. If there is an associated language for the card 104, then the language identification module 122 and the customer language identification module 126 will run to identify, determine and select the appropriate customer language, as shown in block 230 ("Yes" branch 235 to block 250), that may displayed on the customer interface or receipt 114. Block 250 demonstrates that the customer interface is being run for a business transaction and a receipt 114 prints from a printer 112 associated with terminal 100. Further, during the business transaction, block 250, the user interface display 106 displays a operator interface language that corresponds to the merchant language and provides instructions, pricing and other expressions and information that would normally occur during a business transaction that takes place utilizing a credit card to a merchant. The term operator language and merchant language are used interchangeably throughout and have the same meaning. The receipt 114 prints in the appropriate customer language of the customer as shown in block 260. The receipt 114 will display the normal information that a merchant would give to a customer for a business transaction including but not limited to such items as cost, business establishment's name, the business establishment's location and phone number, time of the business transaction, customer account information, signature line and any other possible information that would normally be included on a credit card receipt and it all would be displayed in the customer language.

If there is no associated language with the card 104 or if there is a language associated with the card 104 ("No" branch 236 to block 240) but it is not identifiable by the customer language identification module 126 sub-routine, then a default language is selected by the customer language identification terminal to be displayed on the receipt, as shown in block 240. The default language may be sent to the processor 110 for display as the customer interface language on the receipt ("DL" branch 245 to block 250). After the business transaction has taken place 250, then a receipt 114 is printed from the printer 112 displaying the normal information that a merchant would give to a customer as detailed above, however the receipt 114 would be printed in the default language. The default language may be selected by the merchant to be the language most commonly used by the customers of the business establishment or the merchant's language or any other criteria the merchant deems acceptable that may allow the merchant to best conduct the business transaction. After the receipt 114 has been printed by the printer 112, the system resets block 265 back to block 210 ("Reset" branch 270 to block 210) in preparation for a new customer to use a card 102 that will activate the terminal unless there may be a need to change the interface language for the terminal 100. The method can also be set to reset all the way back to block 200 if a user, operator or merchant is replaced that speaks one language with a user, operator or merchant that speaks another language as shown in branch 275.

Figure 3:
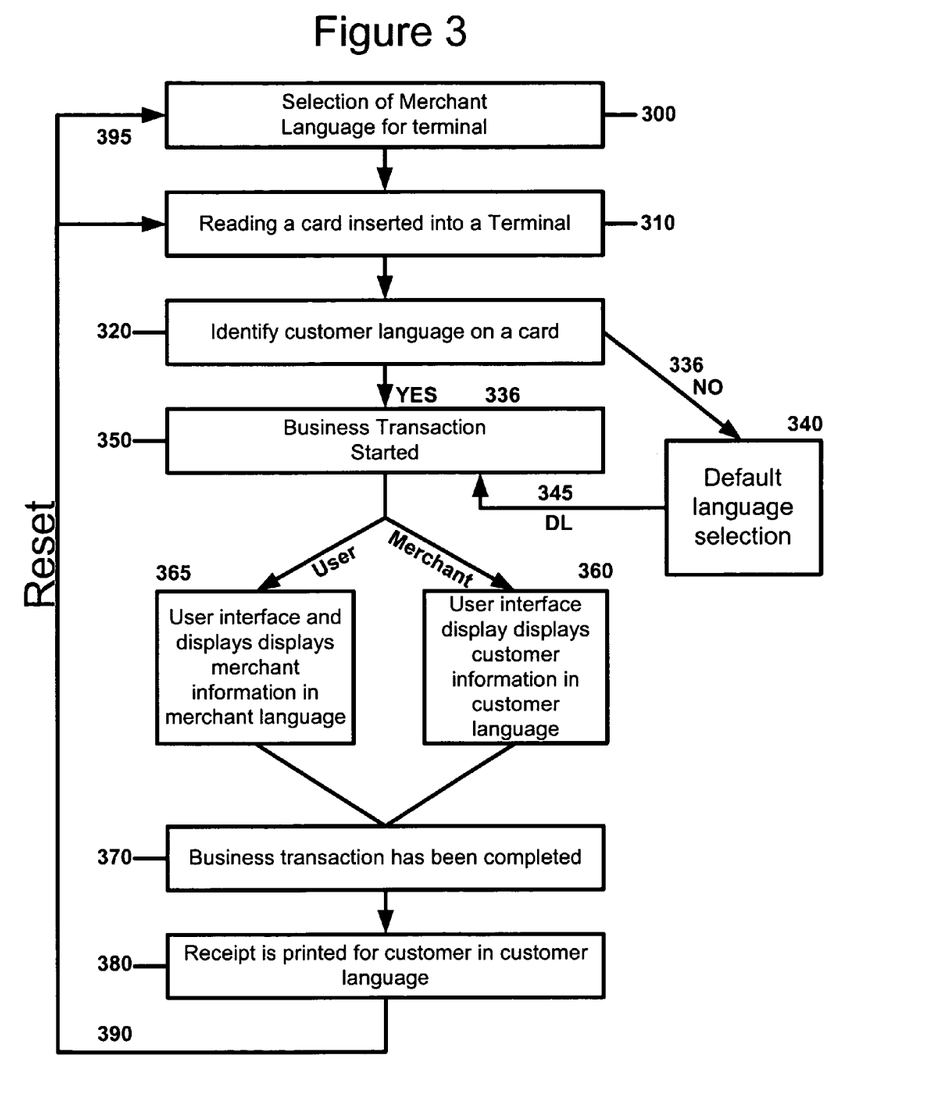
FIG. 3 is a flow diagram depicting a method of use in a system that provides a language for the user interface display to the worker and another language for displaying on the user interface display and for the customer during a business transaction.

FIG. 3 is a flow diagram depicting another embodiment of a method for use in a system that provides one language for the user interface display 106 for the operator and another language might also be displayed on the user interface display 106. There may be instances when a customer might need to view the user interface display 106 to complete the transaction. For example, instead of a credit card transaction, the customer elects to use a debit card to complete the transaction and the user interface display 116 needs to display information in the customer language to complete the business transaction. In this embodiment, there is a business transaction for a stationary credit card or debit card terminal, as shown in FIG. 1, and is located in a retail business establishment and the card is assumed to be a typically credit or debit card terminal with a printer that prints the receipt. However, it is noted that this is no way meant to limit the application of the invention in any way. The flow diagram of FIG. 3 is very similar to the flow diagram of FIG. 2 except the additional steps associated with providing the customer language on the user interface display 106.

At block 300, the merchant may select and store in the memory 116 the merchant language to be used on the user interface display 106 to be shown to the merchant or may allow a default language to be displayed on the user interface display 106 of the terminal 100. The merchant can use the keyboard 108 of terminal 100 to configure the language to be displayed to the merchant on the user interface display 106 or in a similar manner as detailed for FIG. 2.

At block 310, the terminal 100 is configured to accept a portable memory medium like a credit card with a magnetic strip which will allow the card reader 102 to detect the card 104 when it is inserted or swiped by the terminal 100. The terminal 100 is configured to read the card 104 and further configured to determine if a particular language has been stored on the card as shown in block 320. Similar to FIG. 2, the customer language identification module 126 will run to identify, determine and select the appropriate customer language, as shown in block 330 ("Yes" branch 336 to block 350), to be displayed by the user interface display 106 and/or on the receipt 114. However, to conduct a debit card transaction or some credit card transaction, a customer may need to input a personal identification number ("PIN") on the keyboard 108 to verify and confirm the transaction for business transaction to be completed. The user interface display 106, shown in Block 365, displays the words, information and expressions in a merchant language for the merchant's involvement in the business transaction. In block 360, the terminal 100 displays on the user interface display 106 the words, information and expressions in the customer language for the customer's involvement in the business transaction. For example, the user interface display 106 may display in the customer language the necessary words that notify the customer to understand, confirm, approve or any other criteria that would aid in completing the transaction via the keyboard 108. The user interface display 106 displays all normal information to a customer that would complete a debit card transaction including PIN number, cash back and the like, as shown in block 360, in the customer language. Block 370 demonstrates that a business transaction has occurred and a receipt 114 may print from a printer 112, as shown in block 380. For the business transaction, the user interface display 106 may switch back and forth from customer language to merchant language depending on the status of the transaction and who might be viewing the user interface display 106. The receipt 114 will prints and displays the normal information that may be included on a debit card receipt and it all would be displayed in the customer language. After the receipt 114 has been printed by the printer 112, the system resets back to block 310 ("Reset" branch 390 to block 310) in preparation for a new customer to use a card 102 (be it credit or debit card) for a business transaction that will activate the terminal 100 unless there is a need to change the interface language for the terminal 100. The method can also be set to reset all the way back to block 300 if a user, operator or merchant is replaced that speaks one language with a user, operator or merchant that speaks another language as demonstrated in branch 295.

Again, if there is no associated language with the card 104 or if there is a language associated with the card 104 ("No" branch 335 to block 340) but the language is not identifiable by the customer language identification module 126 subroutine, then a default language is selected and displayed on the receipt 114 and the user interface display 106. Again similar to FIG. 2, the default language may be sent to the processor 110 for display on the receipt ("DL" branch 345 to block 350). At the end of the transaction, block 380, a receipt 114 is printed from the printer 112 displaying the normal information that a merchant would give to a customer but the receipt 114 is in the default language. As detailed in FIG. 2, the default language may be selected by the merchant to be the language most commonly used by the customers of the business establishment or the merchant's language or any other criteria that may allow the merchant to best conduct the business transaction.

While the invention has been described in detail and with reference to specific embodiments thereof, it will be apparent to those skilled in the art that various changes and modifications may be made therein without departing from the spirit and scope thereof. Thus, it is intended that the present invention cover the modifications and variations of this invention provided they come within the scope of the appended claims and their equivalents.

What is claimed is:

1. A credit card and debit card transaction terminal comprising:
    a processor;
    a display;
    a memory;
    a card reader configured to read data stored on a memory means of a portable memory medium;
    an operator interface produced by an operator interface program stored in the memory and executable by the processor, the operator interface being displayable on the display in an operator language;
    a customer interface produced by a customer interface program stored in the memory and executable by the processor, the customer interface being displayable in a customer language; and,
    a language identification module stored in the memory and executable on the processor, the language identification module configurable to select the operator language in which the operator interface is displayable for a operator and to select a customer language in which the customer interface is displayable for a customer, wherein said operator language and said customer language being selected from a plurality of languages stored in said module, wherein said customer language and said operator language are different, and wherein transaction facilitating information is presented to the operator in the operator language, and to the customer in the customer language, as part of a transaction.

2. The terminal of claim 1, wherein the language identification module permits selection of the operator language from the plurality of languages stored in the language identification module.

3. The terminal of claim 1, further comprising a printing mechanism.

4. The terminal of claim 3, wherein the printing mechanism is a printer.

5. The terminal of claim 4, wherein the printer issues a record.

6. The terminal of claim 1, wherein the language identification module permits selection of the customer language from the plurality of languages stored in the language identification module.

7. The terminal of claim 6, wherein the user input is configurable to select the customer language for displaying the customer interface to the customer.

8. The terminal of claim 1, wherein said terminal is portable.

9. The terminal of claim 1, wherein the terminal is stationary.

10. The terminal of claim 1, wherein the portable memory medium further comprises an integrated circuit card.

11. The terminal of claim 1, wherein the portable memory medium further comprises a card having a magnetic stripe.

12. The terminal of claim 1, further comprising a plurality of displays.

13. The terminal of claim 1, wherein the data stored on the portable memory medium comprises a language identifier that identifies the customer language preferred by the customer.

14. The terminal of claim 1, wherein the data stored on the portable memory medium comprises a language identifier that identifies the customer language preferred by the operator.

15. A method for facilitating a credit and debit card transaction, comprising:
   storing transaction facilitating information in a plurality of languages in a language identification module;
   permitting an operator to select an operator language from one of the plurality of languages in which transaction facilitating information is stored in the language identification module;
   storing the operator language in a memory for displaying the operator interface on a display in the operator language;
   reading a customer portable memory medium;
   identifying a customer language from the customer portable memory medium;
   selecting customer language, wherein the customer language is selected based on the identified customer language from the plurality of languages in which transaction facilitating information is stored in the language identification module; and,
   conducting a business transaction, wherein the business transaction comprises displaying the operator interface in the operator language on a display and displaying a customer interface in the customer language, wherein the operator language and the customer language are different.

16. The method of claim 15, wherein the customer interface is displayed on the display.

17. The method of claim 15, further comprising printing a receipt for the customer in the customer language, wherein the receipt comprises a record of the transaction.

18. The method of claim 15, wherein a default language is selected as the customer language when the language identification module does not contain transaction facilitating information in the customer language read from the portable memory medium.

19. The method of claim 15, further comprising reading a default operator language from a memory prior to permitting the operator to select the operator language.

20. A Computer readable media containing computer-executable instructions, wherein the computer-executable instructions comprise instructions for:
   storing transaction facilitating information in a plurality of languages in a language identification module;
   selecting an operator language from the plurality of languages in which transaction facilitating information is stored in the language identification module;
   storing said selected operator language in a memory;
   reading a customer portable memory medium;
   identifying a preferred customer language from the customer portable memory medium;
   selecting a customer language from the plurality of languages in which transaction facilitating information is stored in the language identification module based on the preferred customer language identified from the customer portable memory medium;
   displaying an operator interface in a display in the operator language for conducting a business transaction; and,
   displaying a customer interface in the customer language for conducting the business transaction.

21. The method of claim 20, wherein the customer interface is displayed on the display.

22. The method of claim 20, wherein a default language is selected as the customer language when the language identification module does not contain transaction facilitating information in the preferred customer language.

23. The method of claim 20, further comprising printing a receipt for the customer in the customer language, wherein the receipt comprises a record of the transaction.

24. A method for facilitating a business transaction between an operator, wherein the operator is conversant in an operator language, and a customer, wherein the customer is conversant in a customer language, wherein the customer language and the operator language are different, and wherein the business transaction is facilitated by displaying information on a credit card and debit card terminal, the method comprising:
   storing transaction facilitating information in a plurality of languages in a language identification module;
   enabling the operator to select the operator language from the plurality of languages for which transaction facilitating information is stored in the language identification module;
   storing the selected operator language in a memory;
   reading a preferred customer language from a customer portable memory medium;
   determining whether the preferred customer language is one of the plurality of languages in which transaction facilitating information is stored in the language module, wherein the preferred customer language is selected as the customer language if the preferred customer language is one of the plurality of languages in which transaction facilitating information is stored in the language identification module, and wherein if the preferred customer language is not one of the plurality of languages stored in the language identification module, then a default language is selected as the customer language;
   permitting the customer to confirm the selected customer language;
   displaying the operator interface from an operator interface program in the operator language on a first display whereby an operator can conduct a business transaction; and,
   displaying a customer interface from a customer interface program in the customer language on a second display for conducting a the business transaction, wherein the customer language and the operator language are different and, wherein the customer interface is displayable on the second display in the customer language for receiving input from the customer.

25. The method of claim 24, further comprising printing a receipt for the customer in the customer language, wherein the receipt comprises a record of the transaction.

26. The method of claim 24, wherein the first display and the second display are the same display.

* * * * *